(12) United States Patent
Massa et al.

(10) Patent No.: US 9,701,272 B2
(45) Date of Patent: Jul. 11, 2017

(54) CURTAIN AIRBAG WITH OFFSET COUNTERMEASURE

(71) Applicant: Key Safety Systems, Inc., Sterling Heights, MI (US)

(72) Inventors: Joseph Massa, Rochester Hills, MI (US); Bruce A Kalandek, Dearborn, MI (US); Mutaz Shkoukani, Macomb, MI (US); Roland Furtado, Novi, MI (US); Matthias Volkmann, Kronberg (DE); Calum Beattie, Rochester Hills, MI (US); Daniel Bujaidar, Washington, MI (US); Mike Stojanovski, Macomb, MI (US); Kenneth D Moniaci, Royal Oak, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 14/899,240

(22) PCT Filed: Jun. 27, 2014

(86) PCT No.: PCT/US2014/044602
§ 371 (c)(1),
(2) Date: Dec. 17, 2015

(87) PCT Pub. No.: WO2014/210475
PCT Pub. Date: Dec. 31, 2014

(65) Prior Publication Data
US 2016/0129875 A1     May 12, 2016

Related U.S. Application Data

(60) Provisional application No. 61/839,913, filed on Jun. 27, 2013.

(51) Int. Cl.
*B60R 21/213* (2011.01)
*B60R 21/232* (2011.01)
(Continued)

(52) U.S. Cl.
CPC .......... *B60R 21/232* (2013.01); *B60R 21/213* (2013.01); *B60R 21/2338* (2013.01);
(Continued)

(58) Field of Classification Search
CPC ............ B60R 21/213; B60R 21/23138; B60R 21/232; B60R 21/2338; B60R 2021/0009;
(Continued)

(56) References Cited

U.S. PATENT DOCUMENTS 5,575,497 A * 11/1996 Suyama ................. B60R 21/231
280/730.1
6,073,960 A * 6/2000 Viano .................... B60R 21/231
280/730.1
(Continued)

FOREIGN PATENT DOCUMENTS

JP     2012096780 A * 5/2012

*Primary Examiner* — Laura Freedman
(74) *Attorney, Agent, or Firm* — Markell Seitzman (57) ABSTRACT

A curtain airbag (10A-10F) for a vehicle (2) has an inflatable cushion. The cushion (10A-10F) has one or more side inflatable portions extending along one side of the interior of the vehicle (2) adjacent the interior door or doors on the one side and an inflatable frontal portion (12) projecting inwardly directionally toward the interior of the vehicle positioned in front of a seated occupant (1) and between the occupant (1) and an instrument panel or dash of the vehicle. Preferably, the inflatable frontal portion (12) is positioned between the occupant (1) and the steering wheel (4) wherein the frontal portion (12) laterally juts into the passenger compartment forming an inflatable barrier between a front pillar (60) of the vehicle (2) and the occupant (1).

9 Claims, 9 Drawing Sheets (51) Int. Cl.
  *B60R 21/2338* (2011.01)
  *B60R 21/231* (2011.01)
  *B60R 21/00* (2006.01)
  *B60R 21/16* (2006.01)

(52) U.S. Cl.
  CPC *B60R 21/23138* (2013.01); *B60R 2021/0023* (2013.01); *B60R 2021/0053* (2013.01); *B60R 2021/0055* (2013.01); *B60R 2021/161* (2013.01); *B60R 2021/23386* (2013.01); *B60R 2021/23388* (2013.01)

(58) Field of Classification Search
  CPC ...... B60R 2021/0023; B60R 2021/161; B60R 2021/23386; B60R 2021/23388
  See application file for complete search history.

(56) References Cited

U.S. PATENT DOCUMENTS

| | | | | |
|---|---|---|---|---|
| 6,695,342 B2* | 2/2004 | Tanase | ............... | B60R 21/213 280/730.2 |
| 6,695,347 B2* | 2/2004 | Sonnenberg | ......... | B60R 22/195 280/730.2 |
| 7,350,804 B2* | 4/2008 | Bakhsh | ............... | B60R 21/232 280/730.2 |
| 7,549,672 B2* | 6/2009 | Sato | ............... | B60R 21/207 280/729 |
| 7,618,057 B2* | 11/2009 | Pinsenschaum | ...... | B60R 21/232 280/729 |
| 7,823,922 B2* | 11/2010 | Mitchell | ............... | B60R 21/232 280/730.2 |
| 7,988,187 B2* | 8/2011 | Yamamura | ........... | B60R 21/232 280/730.2 |
| 8,020,888 B2* | 9/2011 | Cheal | ............... | B60R 21/213 280/729 |
| 8,579,323 B2* | 11/2013 | Kato | ............... | B60R 21/213 280/729 |
| 8,636,301 B1* | 1/2014 | Wang | ............... | B60R 21/232 280/730.2 |
| 8,764,053 B1* | 7/2014 | Dix | ............... | B60R 21/203 280/729 |
| 8,894,094 B2* | 11/2014 | Wang | ............... | B60R 21/232 280/730.2 |
| 8,899,617 B2* | 12/2014 | Fukawatase | ......... | B60R 21/232 280/730.2 |
| 8,967,660 B2* | 3/2015 | Taguchi | ............... | B60R 21/233 280/729 |
| 8,998,250 B2* | 4/2015 | Kruse | ............... | B60R 21/232 280/729 |
| 9,067,562 B2* | 6/2015 | Nakashima | ........... | B60R 21/232 |
| 9,108,588 B2* | 8/2015 | Fukawatase | ......... | B60R 21/233 |
| 9,114,777 B2* | 8/2015 | Fukawatase | ......... | B60R 21/232 |
| 9,266,494 B2* | 2/2016 | Wang | ............... | B60R 21/237 |
| 2008/0129023 A1 | 6/2008 | Heigl | | |
| 2014/0203541 A1* | 7/2014 | Wei | ............... | B60R 21/213 280/730.2 |
| 2015/0115581 A1* | 4/2015 | Mazanek | ............... | B60R 21/232 280/730.2 |
| 2016/0039383 A1* | 2/2016 | Hicken | ............... | B60R 21/232 280/729 |
| 2016/0107602 A1* | 4/2016 | Nakashima | ........... | B60R 21/233 280/728.2 |
| 2016/0280178 A1* | 9/2016 | Kruse | ............... | B60R 21/232 |
| 2016/0288762 A1* | 10/2016 | Deng | ............... | B60R 21/0136 |

\* cited by examiner

CURTAIN AIRBAG WITH OFFSET COUNTERMEASURE

FIELD OF THE INVENTION

The present invention relates to a curtain airbag, more particularly to a curtain airbag with an improved offset impact countermeasure.

BACKGROUND OF THE INVENTION

During a vehicle collision, the occupant is protected typically by a driver side airbag, a curtain airbag and sometimes a side airbag projected from the seat. These airbags provide cushioning for the occupant and protects him in the event of a collision. The curtain airbag provides protection from the roof rail down to below the window and provides a cushioning to help protect the head and upper torso area. The steering wheel mounted airbag provides protection to the frontal portion of the occupant. The side airbag projects outwardly and also protects the lower torso area.

It has been discovered that a side impact or a frontal impact have been adequately provided for by these types of devices, however, often an impact occurs where the front corner of the vehicle strikes an opposing or oncoming vehicle also on a front corner or alternatively could hit an obstruction such as a telephone pole on the front corner. This creates a unique offset impact condition that can propel the occupant due to his inertia towards the front A pillar along the side of the door between the steering wheel and the door.

Figure 2:
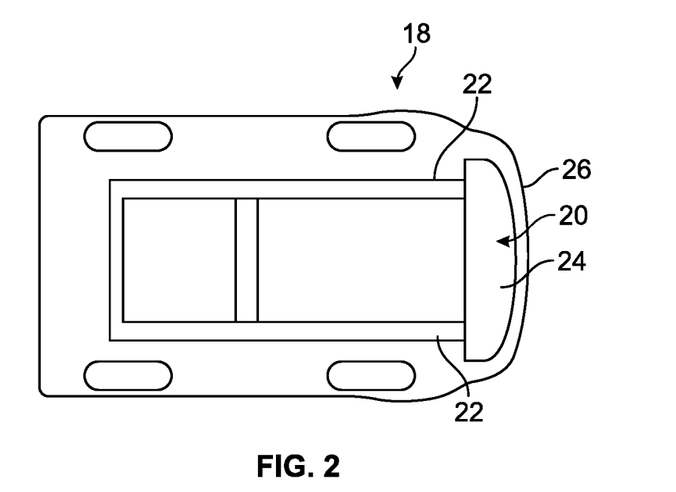
FIG. 2 is a view of a typical vehicle with a front end bumper construction.

With reference to FIG. 2, a representation of a modern vehicle 18 having a frame 20 is illustrated. The frame 20 has longitudinal rails 22 and a cross bar or bumper 24. The bumper 24 is covered by fascia 26. As can be seen from FIG. 2, the bumper 24 does not extend across the entire width of the vehicle. Occasional the bumper 24 ends substantially at the point of the contact with the longitudinal rail 22 or there is just a minor amount of extension of the bumper 24 past the longitudinal rail 22. Portions of the vehicle to the right or the left of the bumper 24 are less protected than the center portion of the vehicle.

Figure 2A:
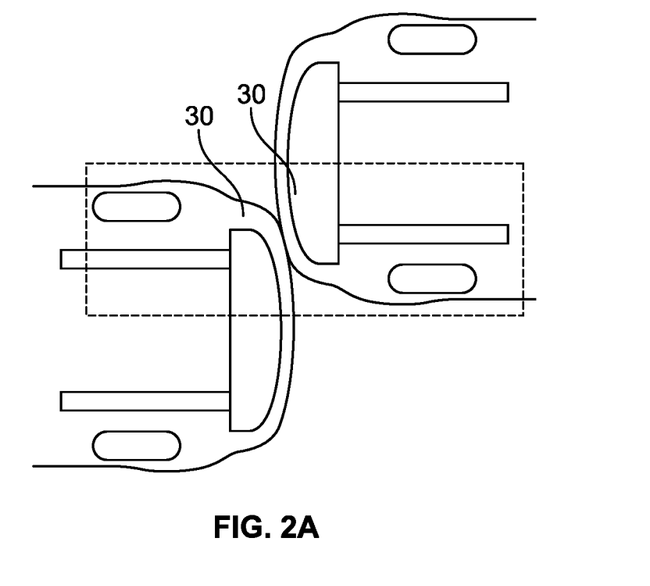
FIG. 2A shows a front end corner or off center two vehicle collision.
Figure 2B:
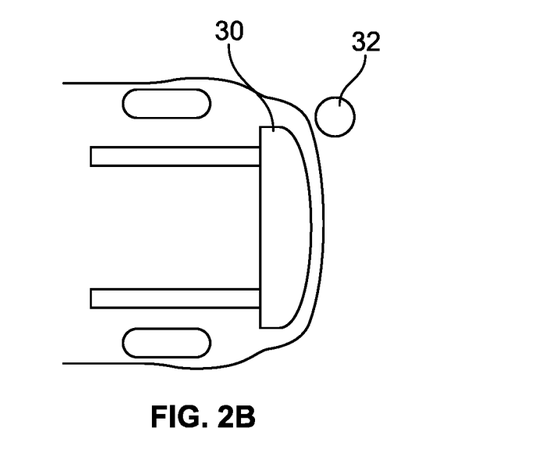
FIG. 2B is an example of an off center obstruction collision of a vehicle hitting a pole.

FIGS. 2A and 2B represent a class of vehicle accident where only the outside corner of the vehicle is initially involved in an accident. With the corner of the second vehicle or an obstruction such as a post or pole or other barrier 32. This type of accident is referred to as a small overlap type accident. In these accidents, it is imperative that the occupant, who is being thrust in an out of position condition directionally towards the A pillar, is protected. It is therefore an objective to provide solutions for this type of accident.

These and other objectives are achieved by the invention described hereinafter.

SUMMARY OF THE INVENTION

A curtain airbag for a vehicle has an inflatable cushion. The cushion has one or more side inflatable portions extending along one side of the interior of the vehicle adjacent the interior door or doors on the one side and an inflatable frontal portion projecting inwardly directionally toward the interior of the vehicle positioned in front of a seated occupant and between the occupant and an instrument panel or dash of the vehicle. Preferably, the inflatable frontal portion is positioned between the occupant and the steering wheel wherein the frontal portion laterally juts into the passenger compartment forming an inflatable barrier between a front pillar of the vehicle and the occupant.

The curtain airbag further has a front tether anchored to a front pillar and attached to the curtain airbag and a rear tether anchored to a rear or rearward pillar and attached to the curtain airbag. On deployment and inflation the front and rear tethers secure the inflated airbag along the interior side of the vehicle.

The frontal portion may be formed as an enlarged bulge having an increased inflatable chamber projecting laterally inwardly. The front tether may be attached to the curtain airbag along a side of the cushion spaced a distance inward of the frontal portion. Upon inflation of the airbag the enlarged frontal portion further can project downwardly toward a seated occupant's lower torso and legs. The front tether can be affixed to the enlarged frontal portion of the curtain airbag.

In an alternative embodiment the curtain airbag has a frontal directing tether. The frontal directing tether is secured at a first end to the vehicle and extends through the cushion toward the interior looping back through the cushion and extending along the cushion frontal portion to a second end secured to the front pillar; and wherein on deployment the curtain cushion inflates tensioning the frontal directing tether to move the frontal portion toward the interior of the vehicle away from the door to create an inflatable cushion barrier between the occupant and the front pillar.

In another embodiment, the curtain airbag has a frontal directing tether. The frontal directing tether is secured to the vehicle at a first end, at an intermediate location spaced from the front pillar, the frontal directing tether extending between the curtain and the vehicle and then through the curtain and attached at a second end to the frontal portion along an interior curtain panel; and wherein upon inflation the frontal directing tether is tensioned by the inflation of the cushion pulling the frontal portion toward the interior to form an inflatable barrier between the occupant and the A pillar.

In yet another embodiment, the curtain airbag has been constructed wherein the inflatable cushion has a first panel side adjacent the door and a second panel side on an interior side of the passenger compartment. The inflatable space between the panels forming inflatable cushions, at least on being at a location between the occupant and the steering wheel, the second panel has one or more pleats extending directionally vertically across the width of the airbag from a lower end to an upper end. The one or more pleats are formed as a fold in the second panel shortens the length compared to the first panel causing the frontal portion to bend laterally toward the interior upon inflation to form an inflatable barrier between the occupant and the front pillar.

In still yet another embodiment, the frontal portion has a plurality of tethers extending from a first panel to a second spaced toward the interior of the vehicle. The first panel is longer than the second wherein upon inflation the tethers pull the frontal portion directionally toward the interior of the passenger compartment to form an inflatable barrier between an occupant and the front pillar.

In all these embodiments, the curtain airbag has a frontal portion bent folded or bulging into the passenger compartment of the vehicle to form an air cushion barrier between the occupant and the front pillar of the vehicle.

BRIEF DESCRIPTION OF THE DRAWINGS

The invention will be described by way of example and with reference to the accompanying drawings in which.

DETAILED DESCRIPTION OF THE INVENTION

Figure 1:
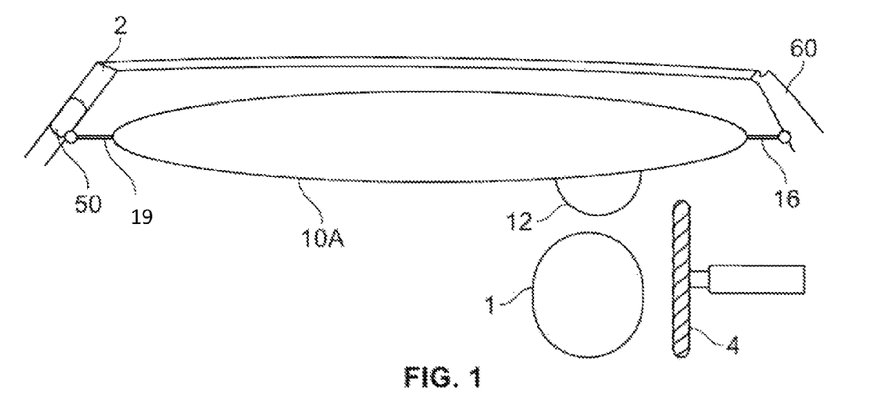
FIG. 1 is a top view of an exemplary curtain airbag made according to the present invention.
Figure 1A:
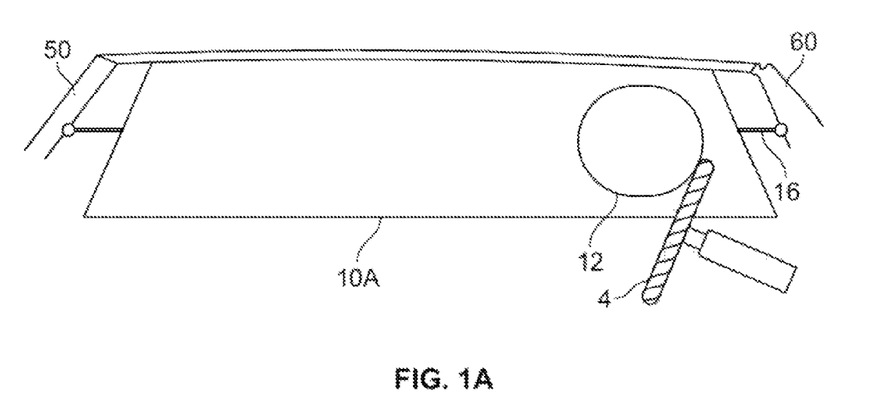
FIG. 1A is a side view of the curtain airbag of FIG. 1.
Figure 1B:
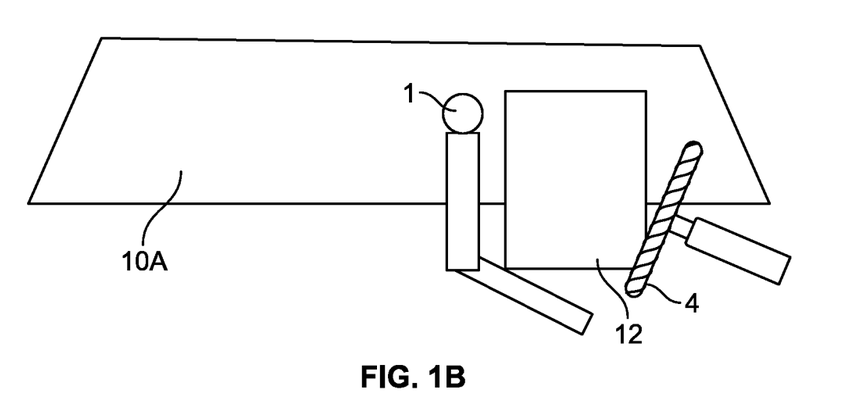
FIG. 1B is a side view showing a modification of the curtain airbag of FIGS. 1 and 1A having a lower bulged frontal region.

With reference to FIG. 1, a curtain airbag 10A is illustrated made according to the present invention. As shown, the curtain airbag 10A from a top view is shown extending downward to an anchor or tether 19 at a rear pillar 50 and extends longitudinally along the vehicle 2 forwardly to a front anchor or tether 16 attached at or near the front or A pillar 60. The curtain airbag 10A extends along the side of the vehicle 2 from the roof rail down to below the windows to provide cushioning for the head and torso area of an occupant 1. As shown, the curtain airbag 10A extends approximately at least up to if not past the steering wheel location. As shown in FIG. 1, the airbag has an enlarged bulging frontal portion 12 adjacent to and just aft of the steering wheel 4 positioned between where an occupant 1 would be sitting and the steering wheel location. This projection of the frontal portion 12 as shown in FIG. 1A extends outwardly from the window side of the vehicle 2 into the passenger compartment and occupies the space between the occupant 1 adjacent the rest of the curtain airbag and the steering wheel. In the event of a collision, an occupant thrust forward would be protected in this space by this enlarged bulging end which forms an air cushioned barrier. With reference to FIG. 1B, a modification of the embodiment of FIG. 1A is illustrated where then enlarged bulged frontal portion 12 extends downwardly towards the legs of the occupant 1. In this case, the enlarged bulged frontal portion 12 can project well below the window opening down along towards the seat and provides additional lateral protection for the occupant. This lateral protection also helps protect the lower legs, lower torso, in addition to the upper portion the upper torso at the frontal portion as illustrated in FIG. 1B.

Figure 3:
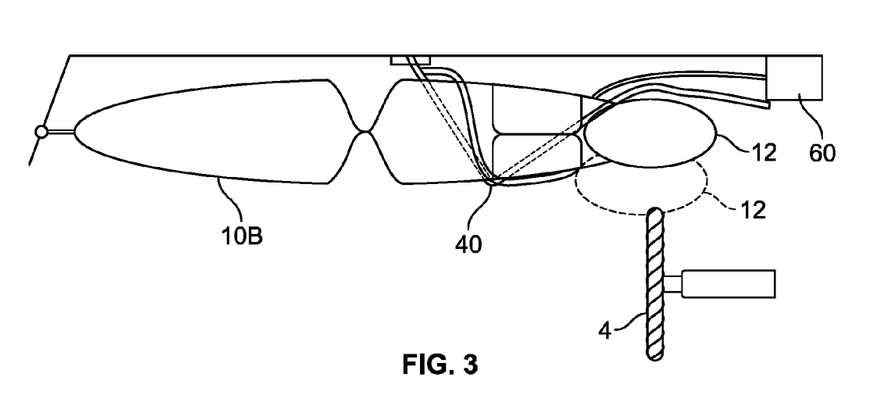
FIG. 3 is a top view of a second embodiment of the present invention.
Figure 3A:
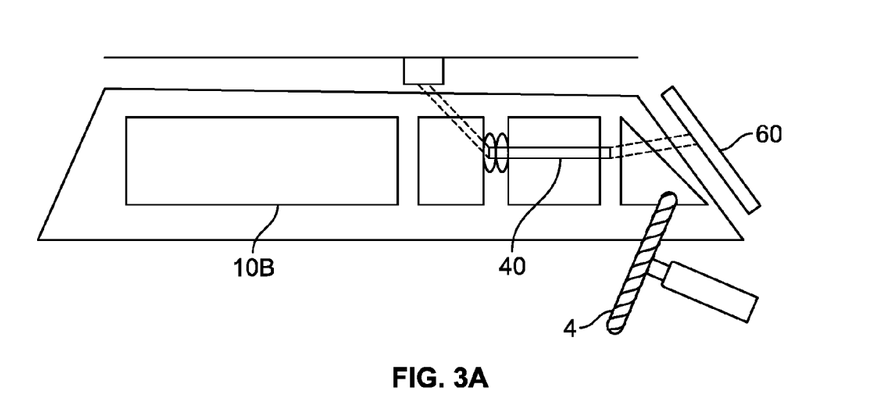
FIG. 3A is a side view of the second embodiment of FIG. 3.

With reference to FIG. 3, a second embodiment is illustrated. In this embodiment, the curtain airbag 10B extends from the rear anchored tethered position to the forward position where it is tethered at the A pillar. In addition, a frontal directing tether 40 is provided as shown in FIG. 3A. This frontal directing tether 40 is anchored either at the roof rail or to the B pillar, preferably near the roof rail. As illustrated, the tether 40 extends through a non-inflated portion of the airbag 10B and overlaps an inflated portion of the airbag 10B in a location where the driver would be sitting. This tether 40 then extends back through a non-inflated portion of the airbag 10B and is then anchored to the front or A pillar 60. During deployment, as the airbag 10B inflates, the tether 40 is tensioned. This tensioning causes the inflated frontal portion 12 of the airbag 10B to be folded directly towards the steering wheel 4. When this occurs, the frontal area of the curtain airbag 10B provides an air cushion barrier to help protect the occupant 1 in this area between the door frame and the steering wheel 4, thus preventing the occupant 1 from being able to be driven into the A pillar 60.

Figure 4:
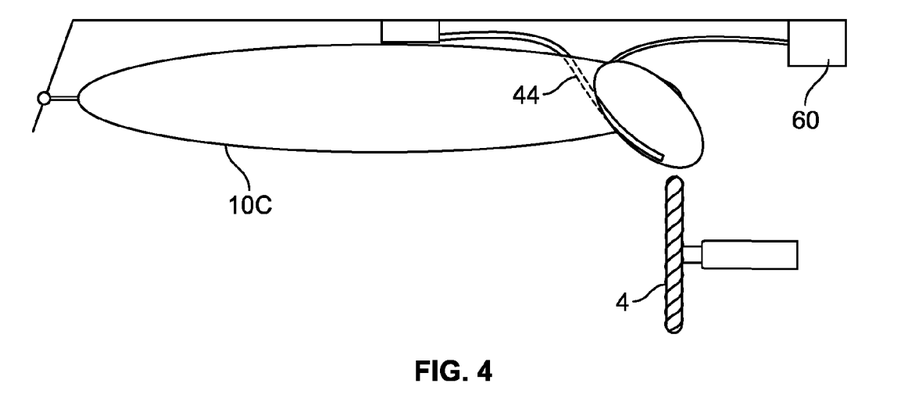
FIG. 4 is a top view of a third embodiment of the present invention.
Figure 4A:
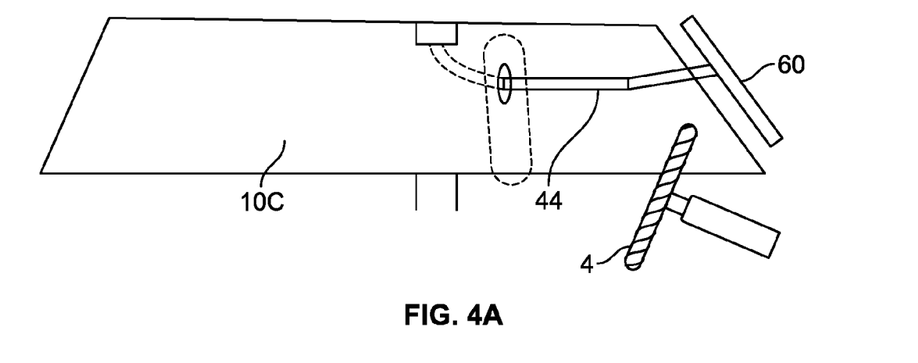
FIG. 4A is a side view of the third embodiment of FIG. 4.

With reference to FIGS. 4 and 4A, a third alternative embodiment curtain airbag 10C is shown very similar to the second alternative embodiment airbag 10B. In this case, a tether 44 is provided; however, the directing tether 44 in the third embodiment airbag 10C extends from the roof rail or B pillar through a non-inflated portion of the airbag 10C and is attached to a frontal portion of the inflated airbag 10C. As such, when the airbag 10C is inflated and the gas fills, the frontal portion of the airbag 10C is pulled by this short tether 44 affixed to the cushion panel as shown. This short tether 44 tensions on inflation of the cushion and pulls the frontal portion of the airbag 10C towards the steering wheel 4 again providing protection for the occupant 1 in this critical location.

Figure 5:
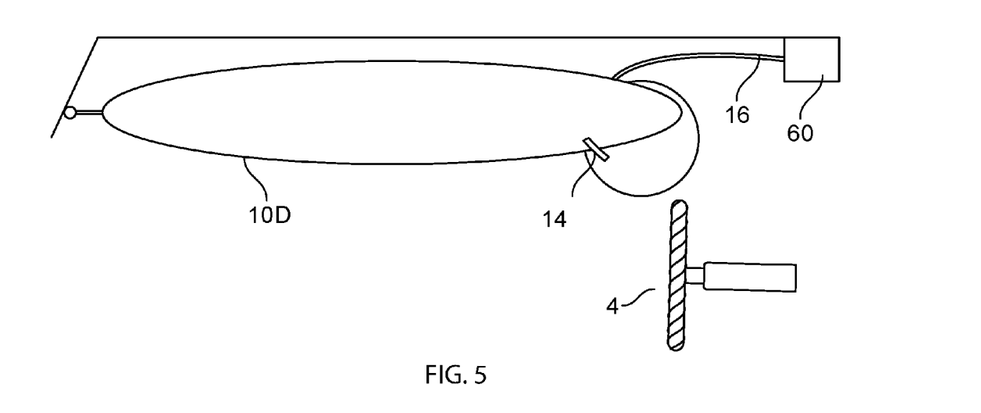
FIG. 5 is a top view of a fourth embodiment of the present invention.
Figure 5A:
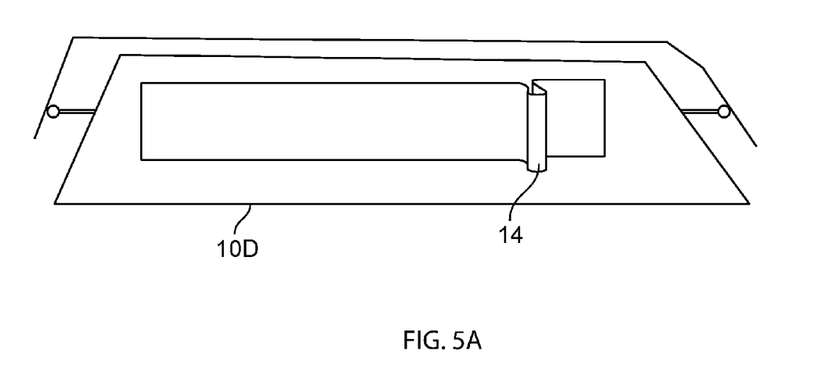
FIG. 5A is a side view of the fourth embodiment of FIG. 5.

A similar alternative way to achieve this inward folding of the frontal portion of the airbag 10D is to create an inflated cushion between the door and the steering wheel 4 providing a pleat 14 as a fourth embodiment of the invention as shown in FIG. 5 where the curtain airbag 10D is tethered at the forward location and a rear location as normal; however, the A panel of the cushion which is adjacent the window and door frame on deployment is provided of a length slightly longer than the B panel of the cushion. This change in length of the B panel is achieved by creating one or more pleats 14. As illustrated in FIGS. 5 and 5A, a single pleat 14 is provided. This pleat 14 extends from the top of the airbag 10D to the bottom as illustrated in FIG. 5A and thereby shortens the length of the B panel. As the airbag 10D inflates, this pleated area forces the front of the airbag 10D to rotate as the backside of the airbag 10D is longer and the shorter frontal portion will then be tensioned in such a fashion that the frontal portion of the airbag 10D will tend to fold. As shown, the A pillar anchored tether for the airbag 10D is attached to the airbag at a location towards the B pillar, preferably between the A and B pillars, affixing the curtain airbag 10D in such a fashion that it pulls the airbag 10D toward the A pillar at a location spaced from the front end of the curtain airbag 10D. This allows the frontal portion of the curtain airbag 10D to fold over directionally towards the steering wheel 4 as illustrated in FIG. 5.

Figure 6:
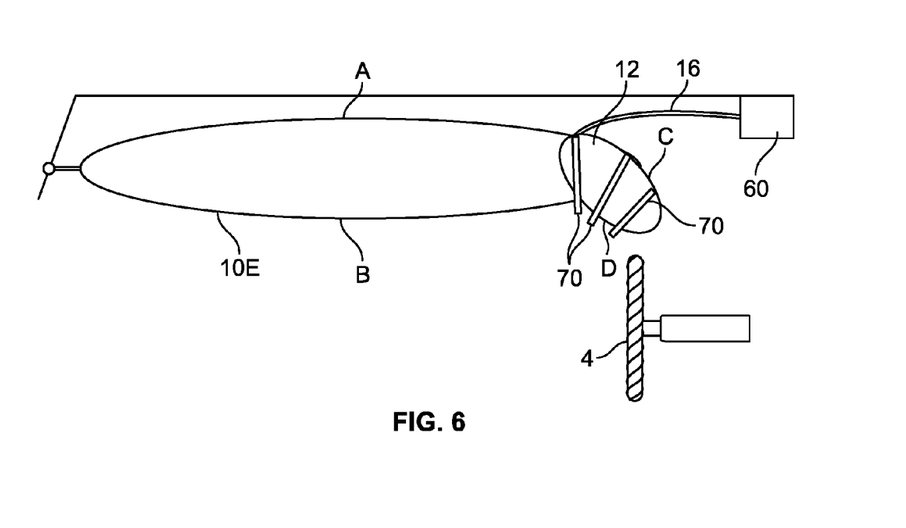
FIG. 6 is a top view of a fifth embodiment of the present invention.
Figure 6A:
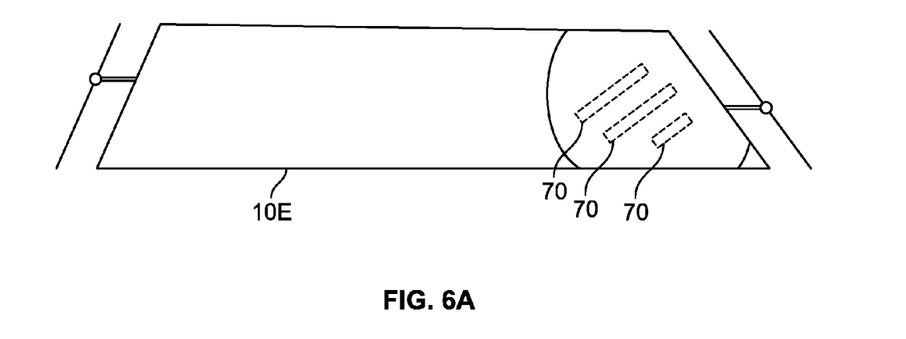
FIG. 6A is a side view of the fifth embodiment of FIG. 6.

With reference to FIGS. 6 and 6A, another alternative embodiment is shown wherein the curtain airbag 10E is attached similar to the embodiment in FIG. 5; however, the front tether 16 is also provided such that it reaches and attaches to the curtain airbag 10E not at the forward most end, but somewhere at a location inward of that end so that the front end or frontal portion 12 of the airbag 10E is free to rotate. To achieve the rotation, tethers 70 can be provided internal or external of the frontal portion of the airbag 10E. These tethers 70 constrain the frontal portion of the airbag 10E and allow it to rotate. If the front panel A is made equal in length to the panel B of the curtain airbag and the front portion has a panel C nearest the window and a panel D. When the panel C is longer than the panel D, it creates and causes a curvature on inflation. This curvature allows the airbag 10E when inflated to rotate inwardly towards the steering wheel 4. This is an alternative way of achieving the cushion blocking in this location between the door frame and steering wheel 4 to protect the occupant 1 from the A pillar 60.

Figure 7:
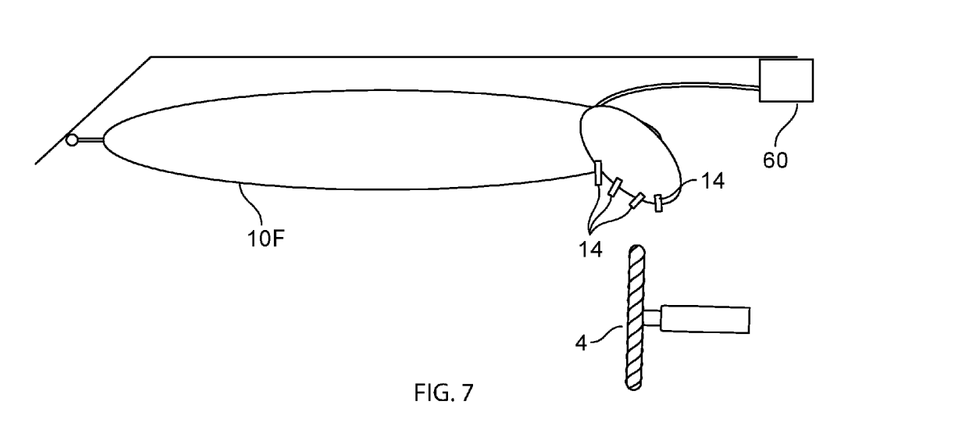
FIG. 7 is a top view of a sixth embodiment of the present invention.
Figure 7A:
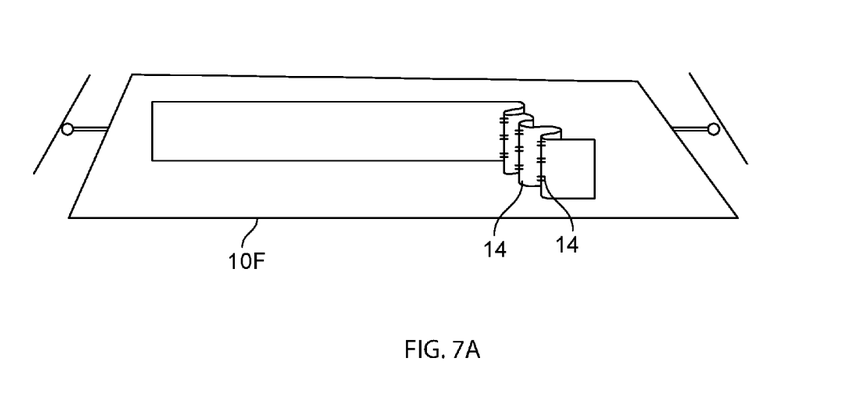
FIG. 7A is a side view of the sixth embodiment of FIG. 7.

With reference to FIGS. 7 and 7A, a sixth embodiment is shown wherein the curtain airbag 10F has a frontal portion with a plurality of pleats 14, preferably, as shown, three or more pleats 14 are used; four pleats 14 are illustrated wherein the front of the airbag 10F having these pleats 14 shortens the length of the B panel forming the airbag substantially compared to that of the A panel adjacent the window and door on deployment. Therefore, upon inflation, the front of the airbag 10F having a tether in the forward end located such that the forward end or frontal portion is free to rotate allows this end of the airbag 10F to bend flaring inwardly towards the steering wheel 4 as illustrated in FIG. 7 to form an inflated barrier.

Figure 8:
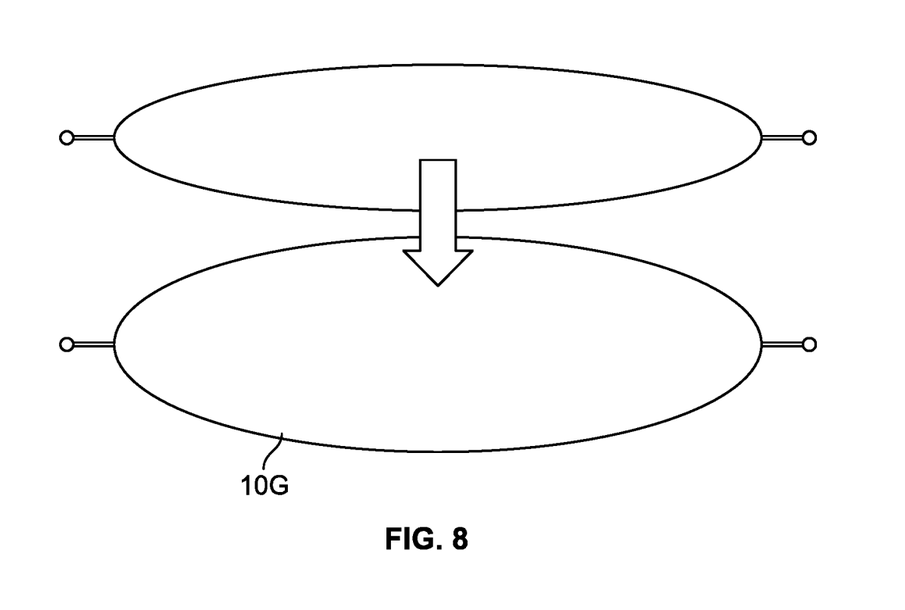
FIG. 8 is a top view of a seventh embodiment of the present invention.
Figure 8A:
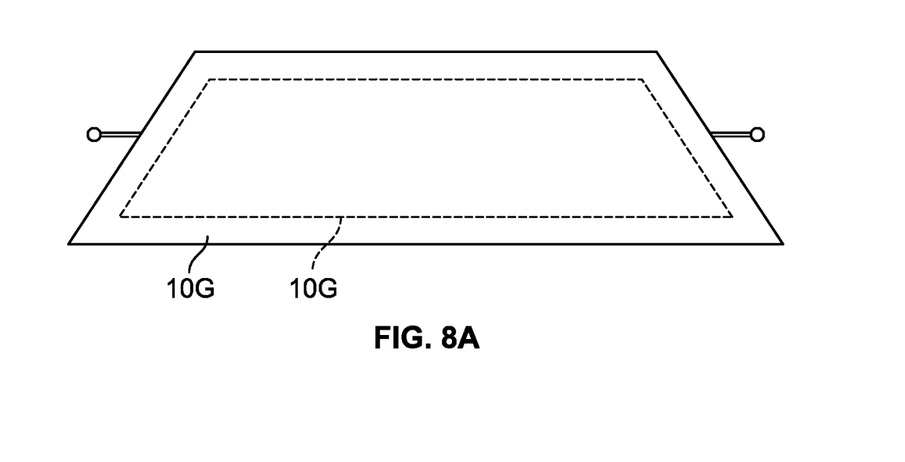
FIG. 8A is a side view of the seventh embodiment of FIG. 7.

With reference to FIGS. 8 and 8A, a seventh embodiment of the airbag 10G is shown wherein the entire curtain airbag 10G has been modified in such a fashion that the airbag has a much larger volumetric chamber. In this fashion, the airbag 10G itself will occupy more space between the passenger and the steering wheel. As such this will achieve the necessary protection. However, it is understood that such a large volume will be difficult to inflate and in such a case may require multiple inflators to achieve such a large cushioning effect. It is for this reason that the other alternatives wherein the airbag has inflatable and non-inflatable portions and the front end is allowed to rotate towards the steering the steering wheel to create protection is believed to be the most desirable solution.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A curtain airbag (10A-10F) for a vehicle (2) comprises:
   an inflatable cushion (10A-10F), the cushion having one or more side inflatable portions extending along one side of an interior of the vehicle adjacent an interior door or doors on the one side and an inflatable frontal portion (12) projecting inwardly directionally toward the interior of the vehicle configured to be positioned in front of a seated occupant (1) and between the occupant and an instrument panel or dash of the vehicle (2);
   a front tether (16) anchored to a front pillar (60) and attached to the curtain airbag;
   a rear tether (19) anchored to a rear pillar (50) and attached to the curtain airbag; and
   wherein on deployment and inflation the front and rear tethers secure the inflated airbag along an interior side of the vehicle (2) and wherein the front tether (16) is attached to the curtain airbag along a side of the cushion spaced a distance inward of the frontal portion (12); and
   wherein the frontal portion (12) has a plurality of tethers extending from a first panel to a second panel spaced toward the interior of the vehicle, the first panel being longer than the second panel wherein upon inflation the plurality of tethers is configured to pull the frontal portion directionally toward the interior of a passenger compartment to form an inflatable barrier between the occupant (1) and the front pillar (60).

2. The curtain airbag (10A-10F) of claim 1 wherein the inflatable frontal portion (12) is configured to be positioned between the occupant (1) and a steering wheel (4) upon inflation.

3. The curtain airbag (10A-10F) of claim 1 wherein the frontal portion (12) laterally juts into the passenger compartment of the vehicle configured to form an inflatable barrier between the front pillar (60) of the vehicle (2) and the occupant.

4. The curtain airbag (10A-10F) of claim 1 wherein the frontal portion (12) is formed as an enlarged bulge having an increased inflatable chamber projecting laterally inwardly.

5. The curtain airbag (10A-10F) of claim 4 wherein upon inflation of the airbag the enlarged bulge of the frontal portion (12) further is configured to project downwardly toward a seated occupant's (1) lower torso and legs.

6. The curtain airbag (10A-10F) of claim 4 further comprises the front tether (16) affixed to the enlarged bulge of the frontal portion (12) of the curtain airbag.

7. The curtain airbag (10A-10F) of claim 1 further comprises:
   a frontal directing tether (40), the frontal directing tether being secured at a first end to the vehicle (2) and extending through the cushion toward the interior looping back through the cushion and extending along the cushion frontal portion (12) to a second end secure to the front pillar (60); and
   wherein on deployment the curtain cushion inflates tensioning the frontal directing tether (40) to move the frontal portion (12) toward the interior of the vehicle (2) away from the door being configured to create an inflatable cushion barrier between the occupant and the front pillar (60).

8. The curtain airbag (10A-10F) of claim 1 has a frontal directing tether (44), the frontal directing tether being secured to the vehicle (2) at a first end, at an intermediate location spaced from the front pillar (60), the frontal directing tether extending between the curtain and the vehicle (2) and then through the curtain and attached at a second end to the frontal portion (12) along an interior curtain panel; and
   wherein upon inflation the frontal directing tether is tensioned by the inflation of the cushion pulling the frontal portion (12) toward the interior configured to form an inflatable barrier between the occupant (1) and the front pillar (60).

9. The curtain airbag (10A-10F) of claim 1 wherein the inflatable cushion has the first panel side adjacent the door and the second panel side on an interior side of the passenger compartment, an inflatable space between the panels forming inflatable cushions, at least one inflatable cushion configured to be at a location between the occupant (1) and a steering wheel (4), the second panel has one or more pleats extending directionally vertically across the width of the airbag from a lower end to an upper end wherein the one or more pleats (14) being formed as a fold in the second panel shortens the length compared to the first panel causing the frontal portion (12) to bend laterally toward the interior upon inflation to form an inflatable barrier between the occupant (1) and the front pillar (60).

* * * * *